(12) United States Patent
Sawada et al.

(10) Patent No.: US 6,344,703 B1
(45) Date of Patent: Feb. 5, 2002

(54) PNEUMATIC BEARING MOTOR

(75) Inventors: Kiyoshi Sawada, Shizuoka; Tomohiko Kawai, Yamanashi, both of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/327,471

(22) Filed: Jun. 8, 1999

(30) Foreign Application Priority Data

Jun. 9, 1998 (JP) .......................................... 10-175343

(51) Int. Cl.[7] .............................. H02K 5/16; H02K 1/12; H02K 3/04; H02K 19/00; H02K 1/22
(52) U.S. Cl. ...................... 310/90; 310/259; 310/208; 310/DIG. 6; 310/164; 310/266
(58) Field of Search ........................ 310/90, 90.5, 254, 310/258, 259, 179, 184, 194, 198, 208, 216, DIG. 6, 164, 266; 384/109, 134

(56) References Cited

U.S. PATENT DOCUMENTS

| | | | |
|---|---|---|---|
| 3,753,016 A | * 8/1973 | Klein | 310/90 |
| 3,877,761 A | * 4/1975 | Boden et al. | 308/10 |
| 4,065,189 A | * 12/1977 | Sikorra | 308/10 |
| 4,076,340 A | * 2/1978 | Meinke et al. | 308/10 |
| 4,103,197 A | * 7/1978 | Ikegami et al. | 310/267 |
| 4,547,713 A | * 10/1985 | Langley et al. | 318/254 |
| 4,641,978 A | * 2/1987 | Kapich | 384/102 |
| 4,658,162 A | * 4/1987 | Koyama et al. | 310/68 R |
| 4,665,331 A | * 5/1987 | Sudo et al. | 310/68 R |
| 4,962,331 A | * 10/1990 | Smith | 310/261 |
| 5,081,388 A | * 1/1992 | Chen | 310/266 |
| 5,179,304 A | * 1/1993 | Kenjo et al. | 310/12 |
| 5,200,661 A | * 4/1993 | Shramo et al. | 310/184 |
| 5,304,883 A | * 4/1994 | Denk | 310/180 |
| 5,355,040 A | * 10/1994 | New | 310/90.5 |
| 5,357,162 A | * 10/1994 | Aiyoshizawa et al. | 310/90 |
| 5,579,188 A | * 11/1996 | Dunfield et al. | 360/99.08 |
| 5,625,241 A | * 4/1997 | Ewing et al. | 310/156 |
| 5,675,200 A | * 10/1997 | Hayashi | 310/90 |

\* cited by examiner

*Primary Examiner*—Nestor Ramirez
*Assistant Examiner*—Dang Dinh Le
(74) *Attorney, Agent, or Firm*—Staas & Halsey, LLP

(57) ABSTRACT

A pneumatic bearing motor with a pneumatic bearing capable of being downsized without lowering the mechanical rigidity thereof. A stator of the pneumatic bearing motor comprises a slot-less stator core and winding which is formed by winding a wire on the stator core into a toroidal shape in a maimer of regular winding. Since the stator does not have projections as exist in conventional stators, it is not necessary to form counterbores in a housing and make wall thickness of the housing large for bearing stress concentration caused by the counterbores. Thus, it is possible to reduce the wall thickness of the housing of the motor and downsize the motor.

13 Claims, 16 Drawing Sheets

F I G. 1
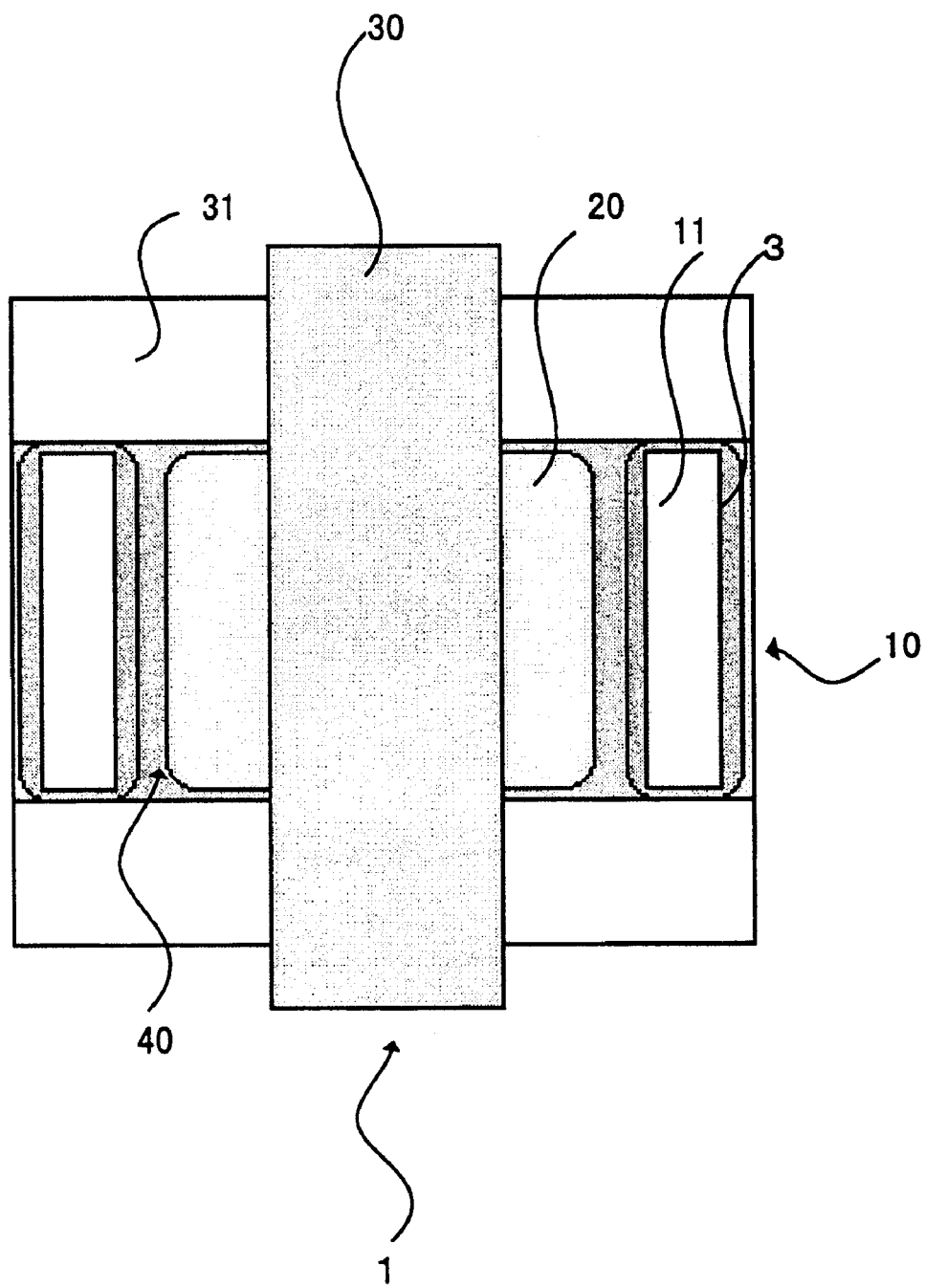

PRIOR ART

PNEUMATIC BEARING MOTOR

BACKGROUND OF THE INVENTION

1. Field of the Invention

The present invention relates to an electric motor, and particularly to a pneumatic bearing motor having pneumatic bearing structure.

2. Description of Related Art

In various precision instruments such as optical instruments, electronic instruments and the like, components need to have machining precision in the order of nanometer to meet a demand for high precision, high density and high integration. Machine tools, steppers and electron beam delineation devices for machining those components with high precision need to able to perform resolution with extremely high precision. In those machining and manufacturing devices, positioning is performed generally by a positioning device, and the position control by the positioning device is performed generally by a rotary servomotor or a linear motor which is controlled by a CNC. Therefore, in order to improve the machining precision of components, it is necessary to control the rotary servomotor or linear motor with high precision.

However, the rotary servomotor or linear motor usually has torque ripple, and therefore it is necessary to reduce the torque ripple in order to control the motor with high precision.

Torque ripple can be broadly classified into machine-structural torque ripple and electromagnetic torque ripple. For example, in the rotary servomotor, frictional resistance acting on bearings for a rotor shaft causes the machine-structural torque ripple, and magnetic distortion produced between a rotor and a stator causes the electromagnetic torque ripple.

In order to reduce the machine-structural torque ripple, it has been proposed to support a shaft in a non-contact manner with a pneumatic bearing or a magnetic bearing to thereby reduce the frictional resistance.

FIG. 17 is a schematic sectional view for explaining a conventional motor structure. As shown in FIG. 17, a stator 110 of a motor has portions of a winding which project from a stator core 111 in the axial direction of the motor, as denoted by reference numeral 104. Those portions are called "lugs of a winding", and do not contribute electromagnetic effect on a rotor. Because of those lugs, the size of the motor is made larger especially when a large number of turns of the winding are formed, to cause an obstacle to downsizing of the motor. In order to cope with this problem in downsizing the motor, there has been proposed a structure such that counterbores 132 are formed in a housing 131 for supporting the stator, by cutting off portions corresponding to the lugs 104 which are projecting portions of the winding, so that the lugs 104 may be received in the counterbores 132.

However, there is a problem that the presence of the counterbores 132 lowers the mechanical rigidity of the motor. Especially in the pneumatic bearing structure in which gas is supplied to a gap 140b between a rotor 120 and the stator 110 and gaps 140a between the rotor 120 and the housing 131 to thereby support the rotor 120 in a non-contact manner, the supplied gas exerts outward forces Fb and Fa on the stator 110 and the housing 131. A concentration of stress is produced by the forces Fb and Fa at portions of the housing 131 close to the counterbores 132 (denoted by A in FIG. 17) to cause distortion. The gaps may change in size by the distortion to make the support of the rotor 120 unstable, and when the distortion is made larger there is even a risk of breaking the housing 131.

Therefore, in the conventional pneumatic bearing motor, a structure having large thickness of the housing has been adopted so as to increase the mechanical rigidity. This structure makes it difficult, however, to downsize the pneumatic bearing motor.

SUMMARY OF THE INVENTION

An object of the present invention is to provide a pneumatic bearing motor capable of downsizing without lowering the mechanical rigidity thereof According to one aspect of the present invention, the motor comprises: a rotor; a pneumatic bearing for rotatably supporting the rotor; and a stator having a slot-less stator core and a winding wound on the stator core layer by layer to form a toroidal shape so that a wire of the winding in each layer is not crossed.

In winding a wire helically to form the toroidal winding, the winding action is performed so that the wound wire does not form a crossing portion in each layer being formed by the winding action, thereby, positional precision of the winding is made high in a direction tangent to the surface of the stator core. Further, in a case of adapting the present invention to a linear motor, the winding is formed by winding a wire helically along an axis of the stator extending linearly.

In a regular winding, the winding is formed layer by layer and each layer is laid one on another, thereby positioning precision of the winding is made high in a direction of a normal line of the surface of the stator core. By improving the positional precision of the winding, the thickness of the whole winding is made uniform.

Thus, by winding a wire around a slot-less stator core to form a toroidal shape in a manner of the regular winding, the formed winding has high positional precision in both tangential direction and normal direction of the surface of the stator core, and the whole winding has a uniform thickness and does not have projections of lugs of winding as in the conventional winding.

The pneumatic bearing motor of the present invention adopting the above described structure of winding, since the stator does not have projections as exist in a conventional stator, it is not necessary to form counterbores in a housing or to make the wall thickness of the housing large for bearing stress concentration. Thus, it is possible to reduce the wall thickness of a housing for a pneumatic bearing motor and downsize the housing.

The winding is formed with high positional precision in the directions tangent and normal to the surface of the stator core, the winding shows uniform electrical resistance and uniform inductance, and therefore produces a uniform magnetic field.

According to another aspect of the present invention, the motor comprises: a rotor; a pneumatic bearing for rotatably supporting the rotor; and a stator having a slot-less stator core and a winding wound on the stator core to form a toroidal shape with a constant pitch. Thus, the winding formed by winding a wire into a toroidal shape at a constant pitch also produces the similar effects to those produced by the winding formed by winding a wire into a toroidal shape in the manner of the regular winding.

The stator may be provided with a covering molded of resin at its radial surface which faces the rotor, and the rotor may be provided with molded resin coating at its radial surface confronting the stator. With the coating, irregularities of surfaces of windings and magnets are compensated to make gas pressure uniform and secure stable support.

Further, with a mechanism for supplying gas to a gap between the stator and the radial surface of the rotor and gaps between the housing and the thrust surfaces of the rotor, large bearing surfaces are secured to thereby improve rigidity of the bearing to support the rotor stably.

BRIEF DESCRIPTION OF THE DRAWINGS

FIG. 1 is a sectional view schematically showing a pneumatic bearing motor according to one embodiment of the present invention;

DETAILED DESCRIPTION OF THE PREFERRED EMBODIMENTS

Figure 2:
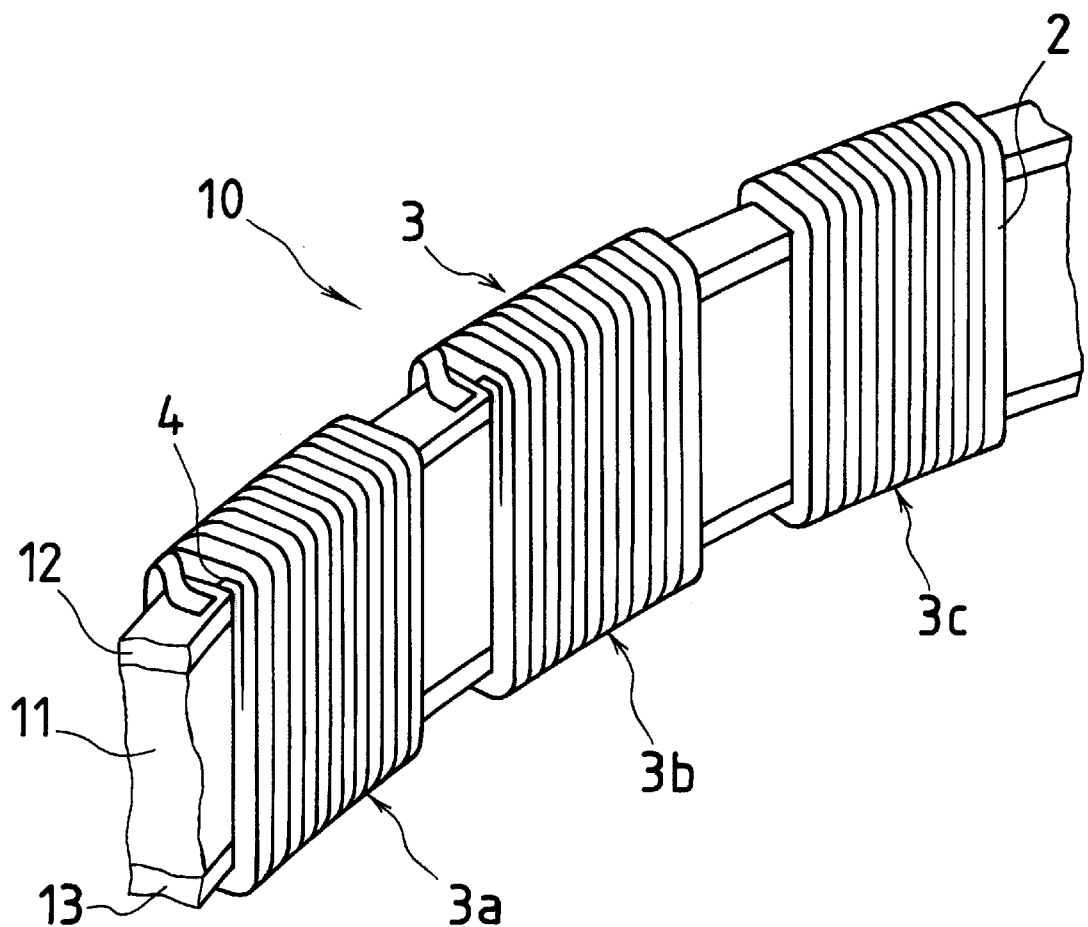
FIG. 2 is a perspective view of a stator of the pneumatic bearing motor shown in FIG. 1 as viewed from a rotor side.

FIG. 1 is a schematic sectional view for explaining a pneumatic bearing motor according to the present invention, taking an example of a rotary motor. In FIG. 1, a pneumatic bearing motor 1 comprises a stator 10 and a rotor 20 having a shaft 30 at a center thereof and rotatably supported by a pneumatic bearing. The stator 10 comprises a slot-less stator core 11 having a shape of a toroid or a short cylindrical tube, and a winding 3 formed by winding a wire into a toroidal shape in a manner of the regular winding. A pneumatic bearing supports the rotor 20 in a non-contact manner such that gas such as air is supplied to a gap 40 between the rotor 20 and the stator 10 and gaps 40 between the rotor 20 and a housing 31 to support the rotor 20 with respect to the stator 10 and the housing 31 by means of the pneumatic pressure.

In the pneumatic bearing motor of the present invention, since the winding is formed by winding a wire into a toroidal shape in a manner of the regular winding, the stator does not have projections called "lugs of a winding" as exist in a conventional stator. This makes it possible to shorten the length of the motor in its axial direction, reduce the wall thickness of the housing 31, and therefore downsize the whole motor.

With a mechanism not shown, compressed air is supplied to the gaps 40. The compressed air is led to each thrust surface of the rotor through a passage (not shown) formed in the housing 31, and to a radial surface of the rotor through a passage (not shown) formed through the stator 10 and the winding.

Figure 3:
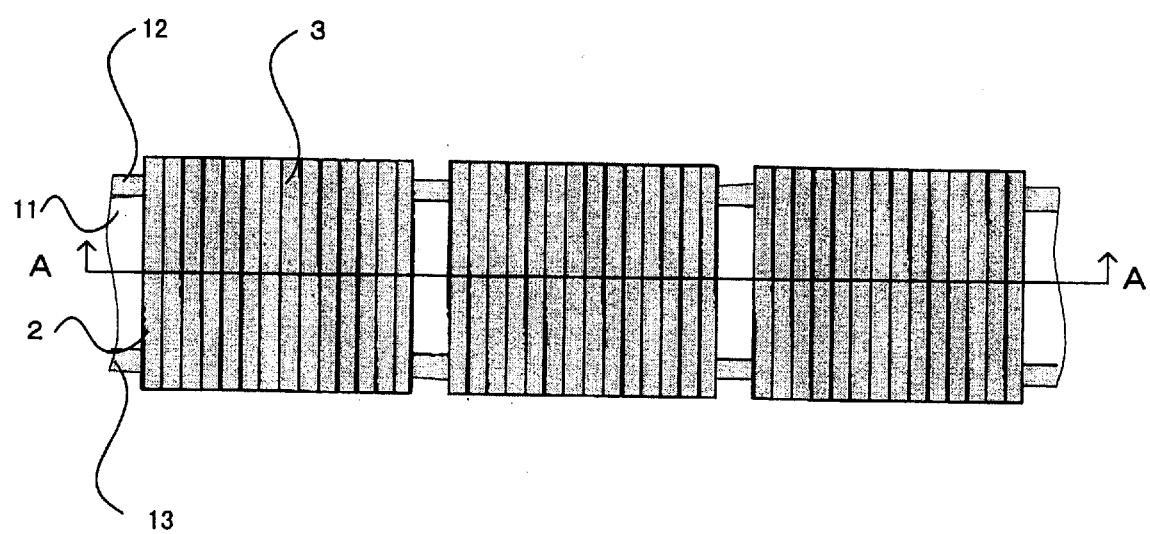
FIG. 3 is a plan view of the stator of a pneumatic bearing motor shown in FIG. 1, as viewed from a rotor side.
Figure 4:
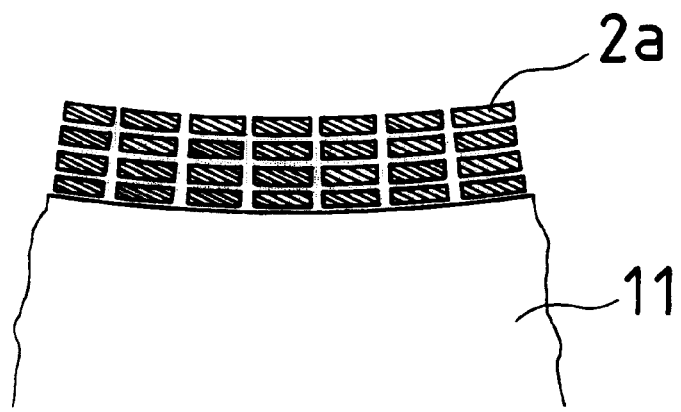
FIG. 4 is a sectional view along a line A—A in FIG. 3.
Figure 5:
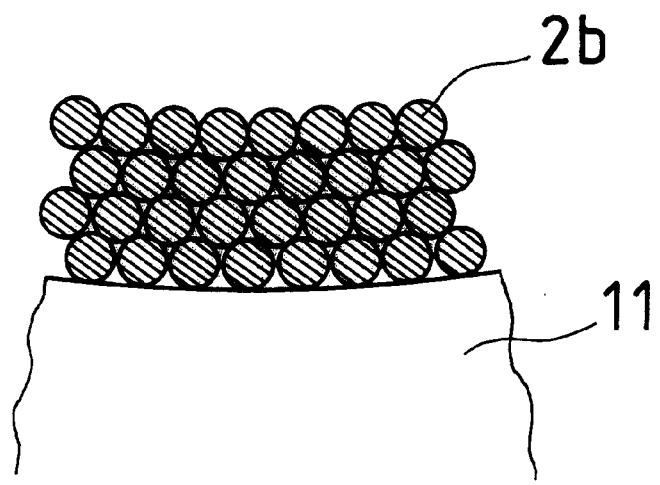
FIG. 5 is a sectional view showing another winding of the stator in the same manner as FIG. 4.
Figure 6:
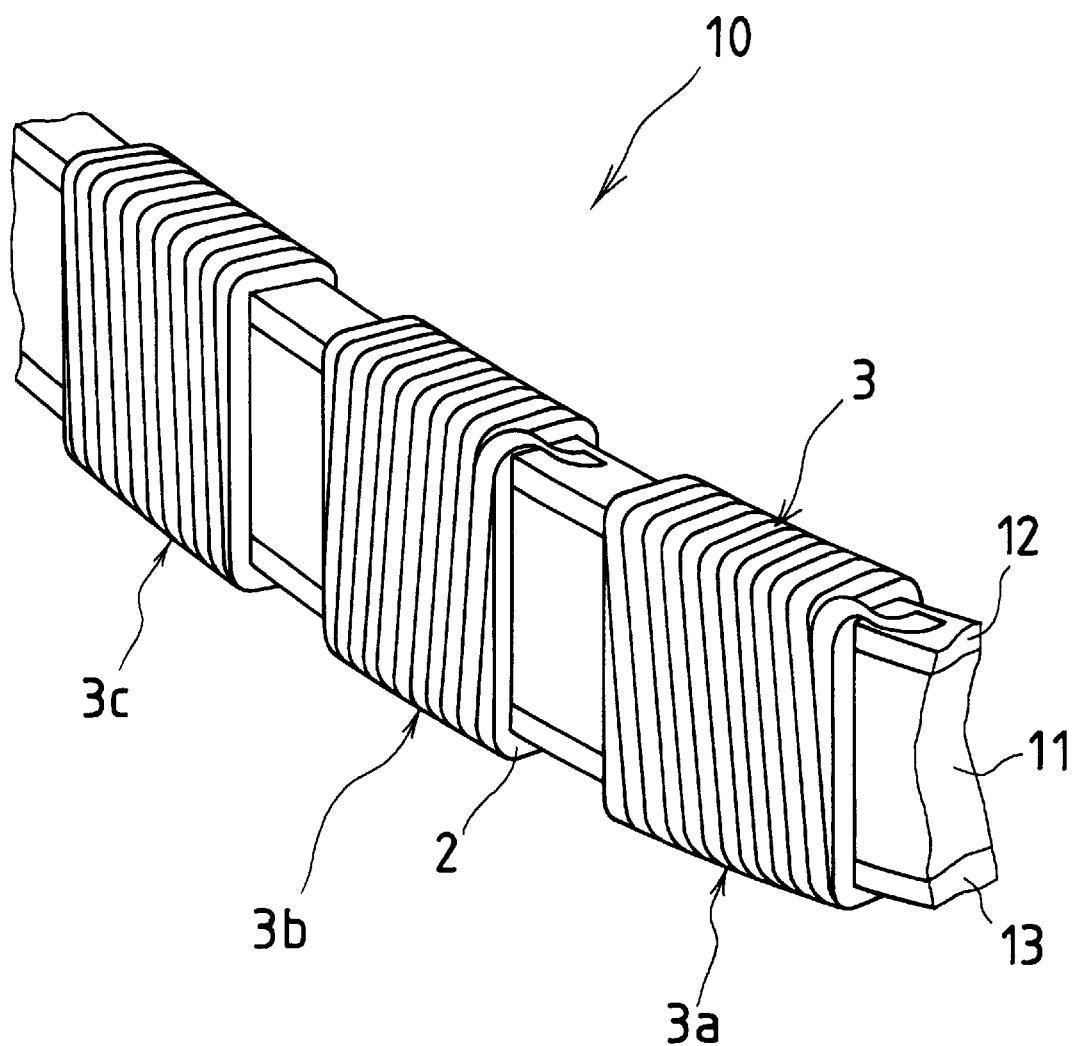
FIG. 6 is a perspective view of the stator of the pneumatic bearing motor shown in FIG. 1, as viewed from outside of the stator.
Figure 7:
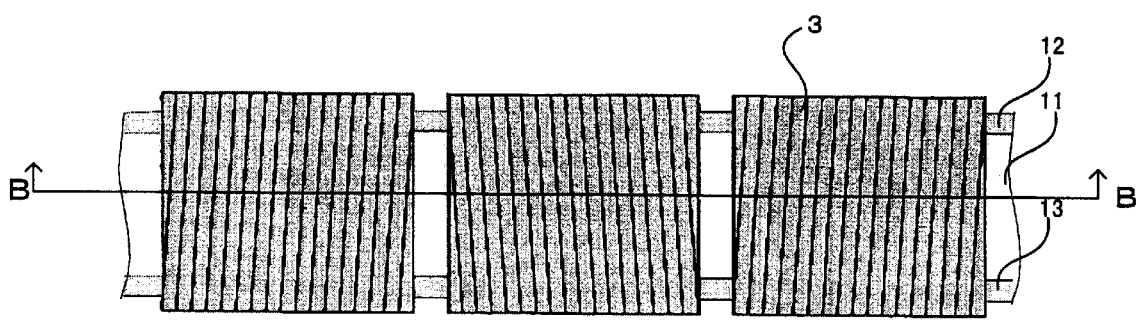
FIG. 7 is a plan view of the stator of the pneumatic bearing motor shown in FIG. 1, as viewed from outside of the stator.
Figure 8:
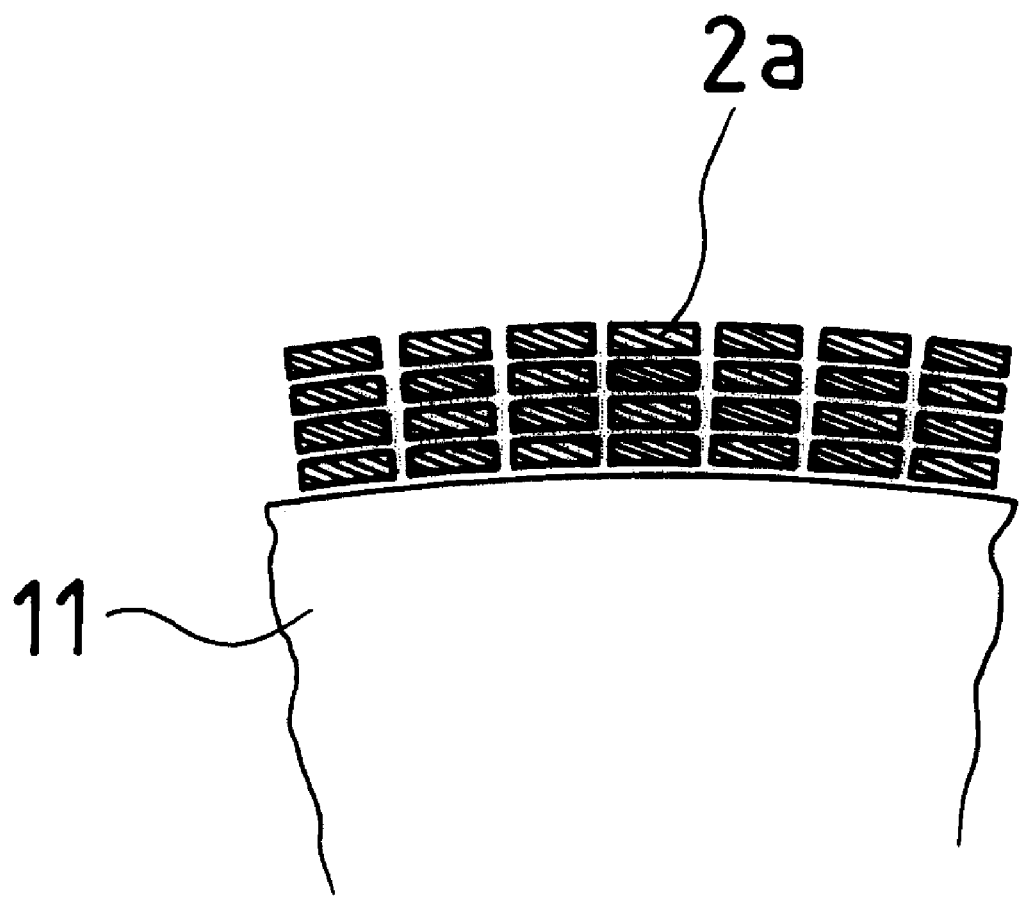
FIG. 8 is a sectional view along a line B—B in FIG. 7.
Figure 9:
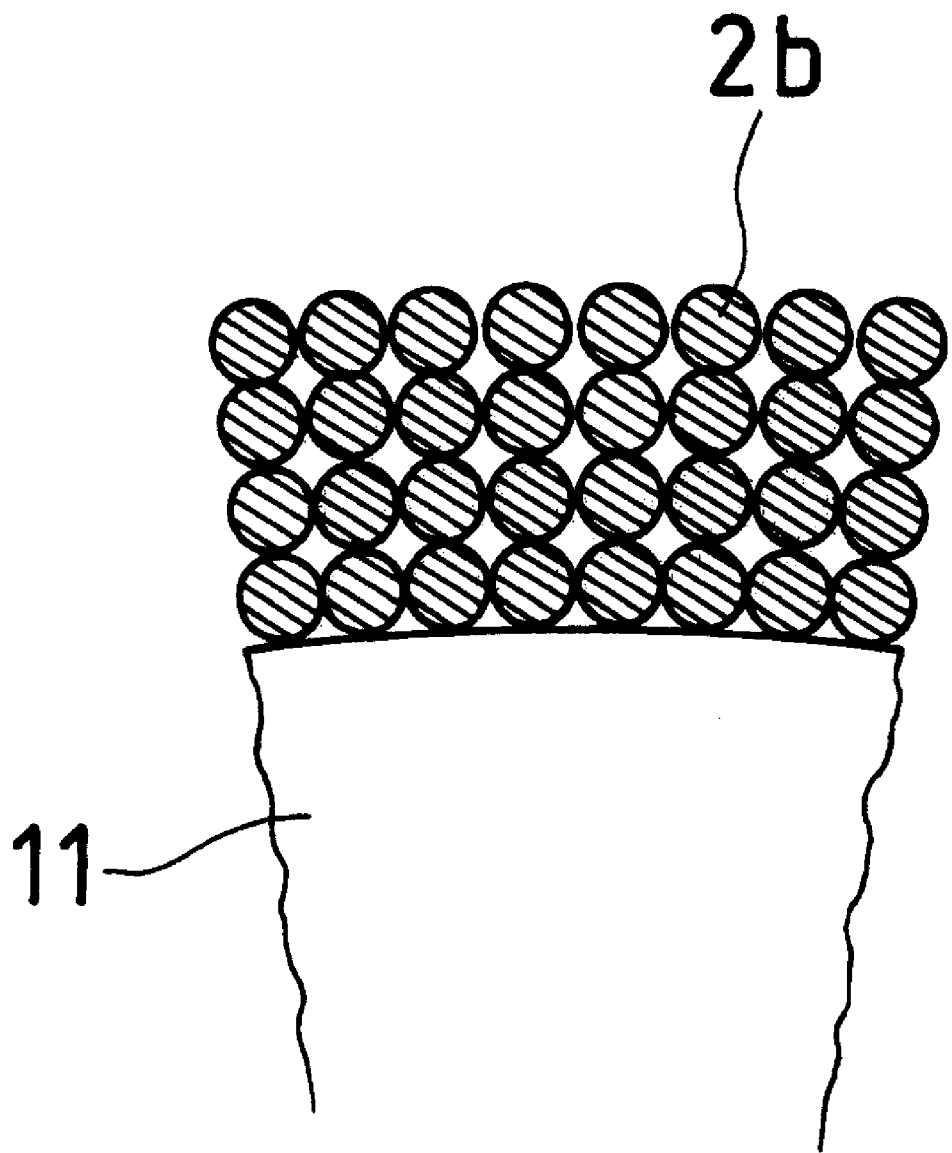
FIG. 9 is a sectional view showing another winding of the stator in the same manner as FIG. 8.

The structure of the stator for use in the pneumatic bearing motor of the present invention will be explained below referring to FIGS. 2 to 9. FIGS. 2 to 9 show an example in which the winding method according to the present invention is applied to a stator for a three-phase AC servomotor. FIGS. 2 to 5 show windings 3 as viewed from a rotor side. FIG. 2 is a perspective view of the stator 10 as viewed from a rotor side, FIG. 3 is a plan view of the stator as viewed from a rotor side, and FIG. 4 is a sectional view along a line A—A in FIG. 3. FIG. 5 is a sectional view showing another winding in the same manner as FIG. 4. FIG. 6 is a perspective view of the stator 10 as viewed from outside, FIG. 7 is a plan view of the stator 10 as viewed from outside, FIG. 8 is a sectional view along a line B—B in FIG. 7, and FIG. 9 is a sectional view showing another winding in the same manner as FIG. 8.

Printed boards 12, 13 are arranged in contact with both end faces of a stator core 11 in the axial direction thereof, and a wire 2 is wound around the printed boards 12, 13 and the stator core 11 so that the printed boards 12, 13 and the stator core 11 are wrapped together by the wound wire 2.

In order to form the winding 3 around the stator core 11 and the printed boards 12, 13 in a toroidal shape, the wire 2 is wound helically and regularly around the printed boards 12, 13 and the stator core 11 along a line in which the stator core 11 extends. With respect to one layer of the winding formed by the helical winding, the wire 2 does not cross itself, as shown in FIG. 3.

After one layer of the winding is formed by winding the wire 2 around the printed boards 12, 13 and the stator core 11 in the extending direction of the stator core 11, the wire 2 is turned back and further wound to form a next layer of the winding on the wounded layer. The subsequent layer is formed by winding the wire 2 in the same manner. Thus, the winding is formed in the manner of the regular winding such that the layers are formed one by one and the formed layer is laid one on another.

In the case of a three-phase eight-pole AC servomotor, for example, each segment 3a, 3g, 3c, ... of the winding 3 is formed within an angular range of 15 degree and the total number of 24 segments (8 poles×3 phases) are formed on the stator core 11 and the printed boards 12, 13. The adjacent segments of the winding 3 are wound in directions opposite to each other. The segments of the same phase, which are arranged with two segments of different phases therebetween and wound in the opposite directions, are connected with one another via the printed board 12 and 13. The segments of each phase are sequentially fed with electric current to be energized, and the rotor 20 is rotated by the electromagnetic force acting between the segments of each phase and magnets provided on the rotor 20.

FIGS. 4 and 5 are illustrations for explaining the regular winding. In FIG. 4, a flat-type wire 2a having a rectangular cross section is shown. The wire 2a is wound into a toroidal shape and forms layers which are successively laid one on another in the direction of a normal line of the surface of the stator core 11. When the wire 2a is wound in a manner such that adjacent sides of the adjacent wire 2a are parallel with each other, a uniform magnetic field can be produced even at the turned-back portion of the wire 2a. Further, by appropriately determining the height-to-width ratio of the cross section of the flat-type wire, the size of the formed winding can be restrained. For example, by winding the flat-type wire so that the shorter sides of rectangular cross section thereof are arranged in the direction of the normal line of the surface of the stator core 11, the thickness of the formed winding in the direction of the normal line can be made smaller.

In FIG. 5, a wire 2b having a round cross section is shown. The wire 2b is wound into a toroidal shape and the wire 2b in each layer is arranged between coils of the wound wire 2b in the lower layer and each layer is laid one on another in the direction of a normal line of the surface of the stator core When winding the wire into a toroidal shape, the wire does not cross itself in each layer in a direction of forming the winding. However, when the winding of the next layer is formed by turning back winding of the wire, the wire cannot avoid crossing with the wire in the next layer. As shown in FIG. 6, the portion where the wire of each layer crosses with the wire in the next layer is arranged on the side of the stator where the crossing wire has a smaller effect on a magnetic field to be produced by the stator, and therefore on rotation of the rotor. In the example shown in FIG. 6, the crossing portion is arranged on the side of the stator which is remote from the rotor. The crossing portion may be arranged on one of end faces of the stator in the axial direction of the stator.

FIG. 7 shows the crossing portion of the winding as viewed from outside of the stator. Adjacent windings show different angles of wires with reference to the axial direction of the stator core.

FIGS. 8 and 9 are illustrations for explaining the regular winding. In FIG. 8, a flat-type wire 2a having a rectangular cross section is shown, and the wire 2a is wound into a toroidal shape and forms layers of winding which are laid one on another in the direction of a normal line of the surface of the stator core 11. In FIG. 9, the wire 2b having a round cross section is shown. The wire 2b is wound into a toroidal shape and is arranged such that the wire 2b in each layer is on the wire 2b in the lower layer. The layers of the winding are formed one on another in the direction of a normal line of the surface of the stator core 11.

According to the pneumatic bearing motor of the present invention in which windings as described are used for the stator, the stator does not have lugs of windings as exist in the conventional windings. Therefore, it is possible to restrain the length of the motor in its axial direction and downsize the motor. The segments of the windings 3 can be contained in the motor without forming counterbores, as shown in FIG. 1, in the housing 31. Therefore, the housing 31 does not need to have a large wall thickness to bear pressure for pneumatic bearing.

Figure 10:
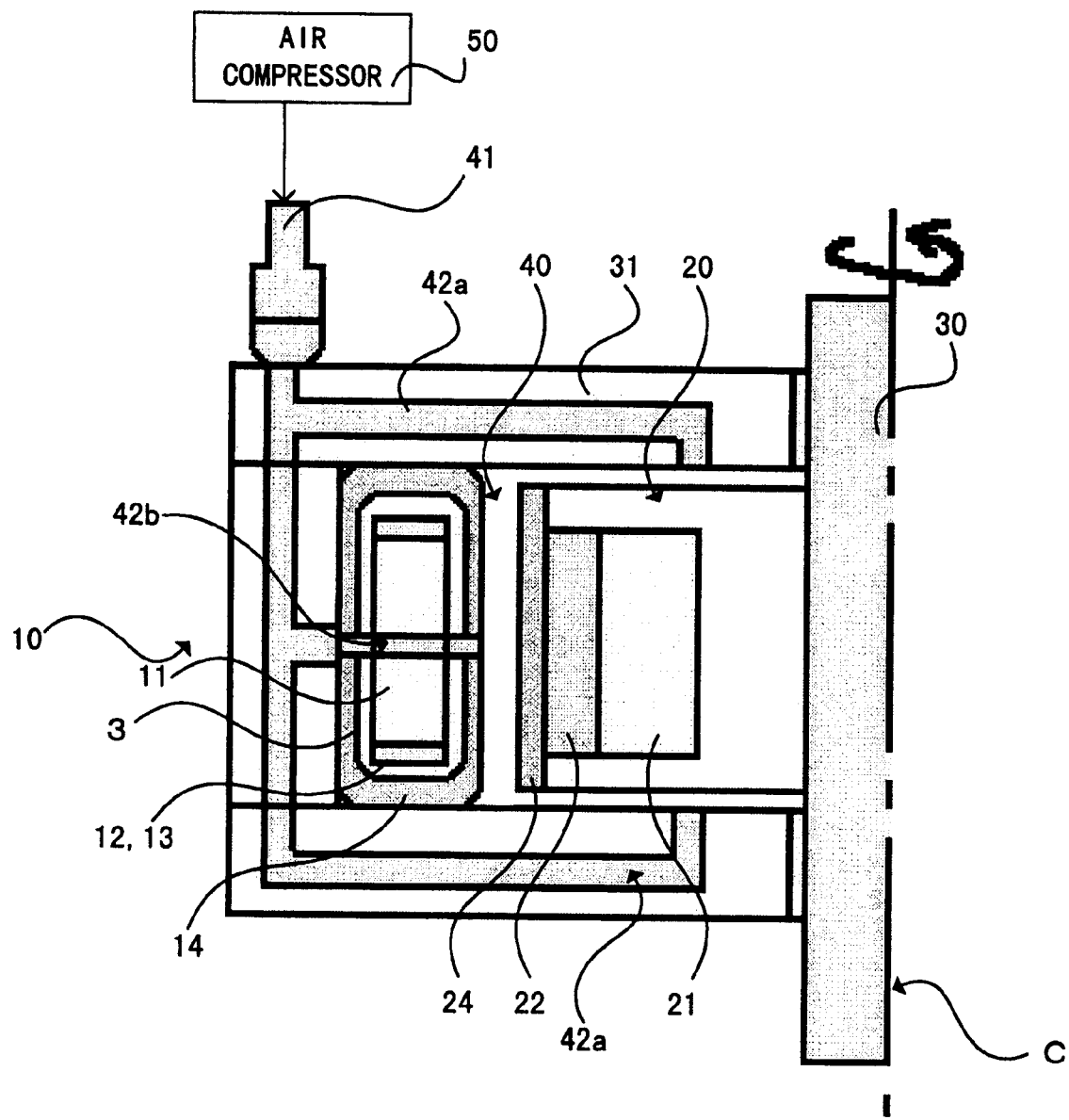
FIG. 10 is a sectional view showing an example of structure of an inner rotor type pneumatic bearing motor according to the present invention.
Figure 11:
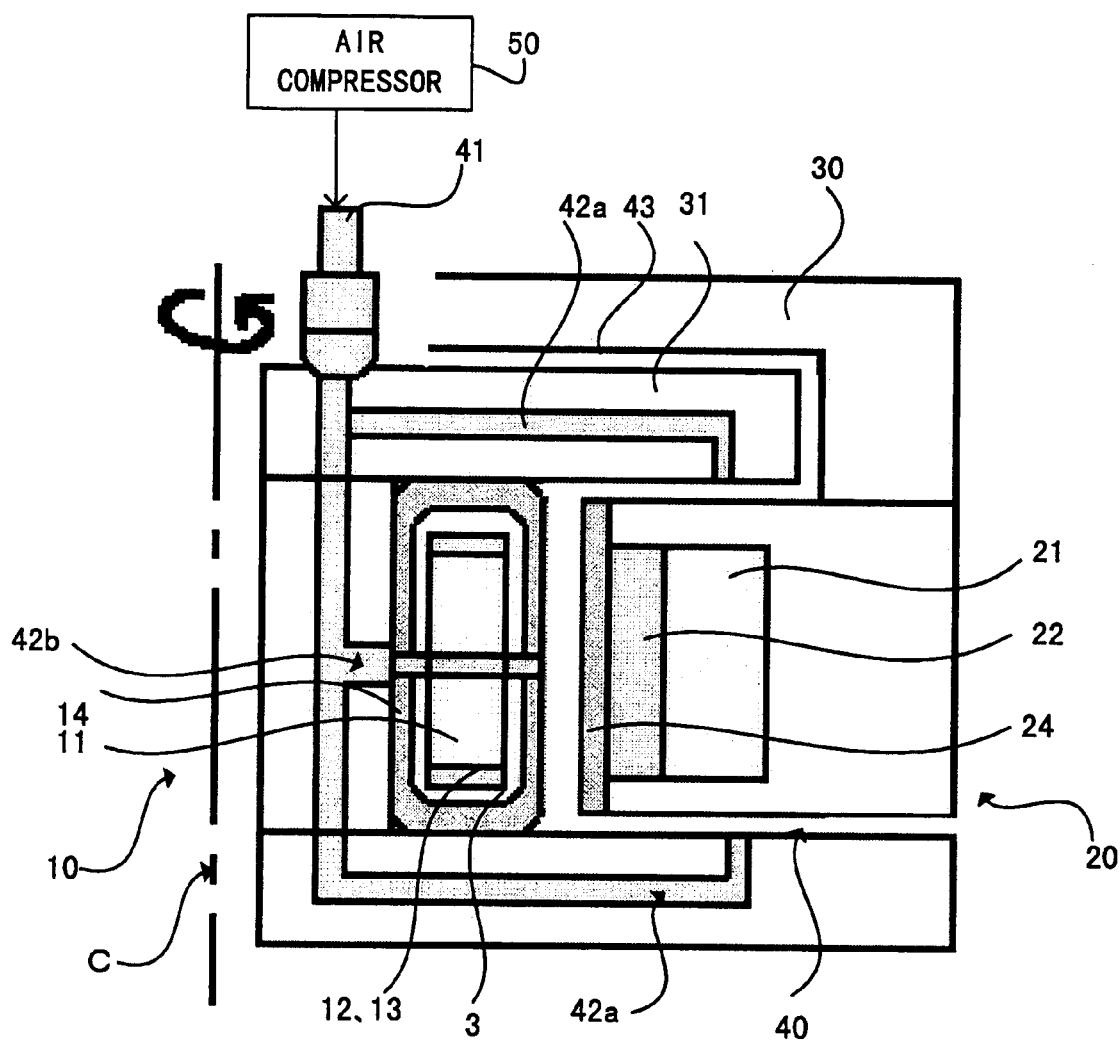
FIG. 11 is a sectional view showing an example of structure of an outer rotor type pneumatic bearing motor according to the present invention.
Figure 12:
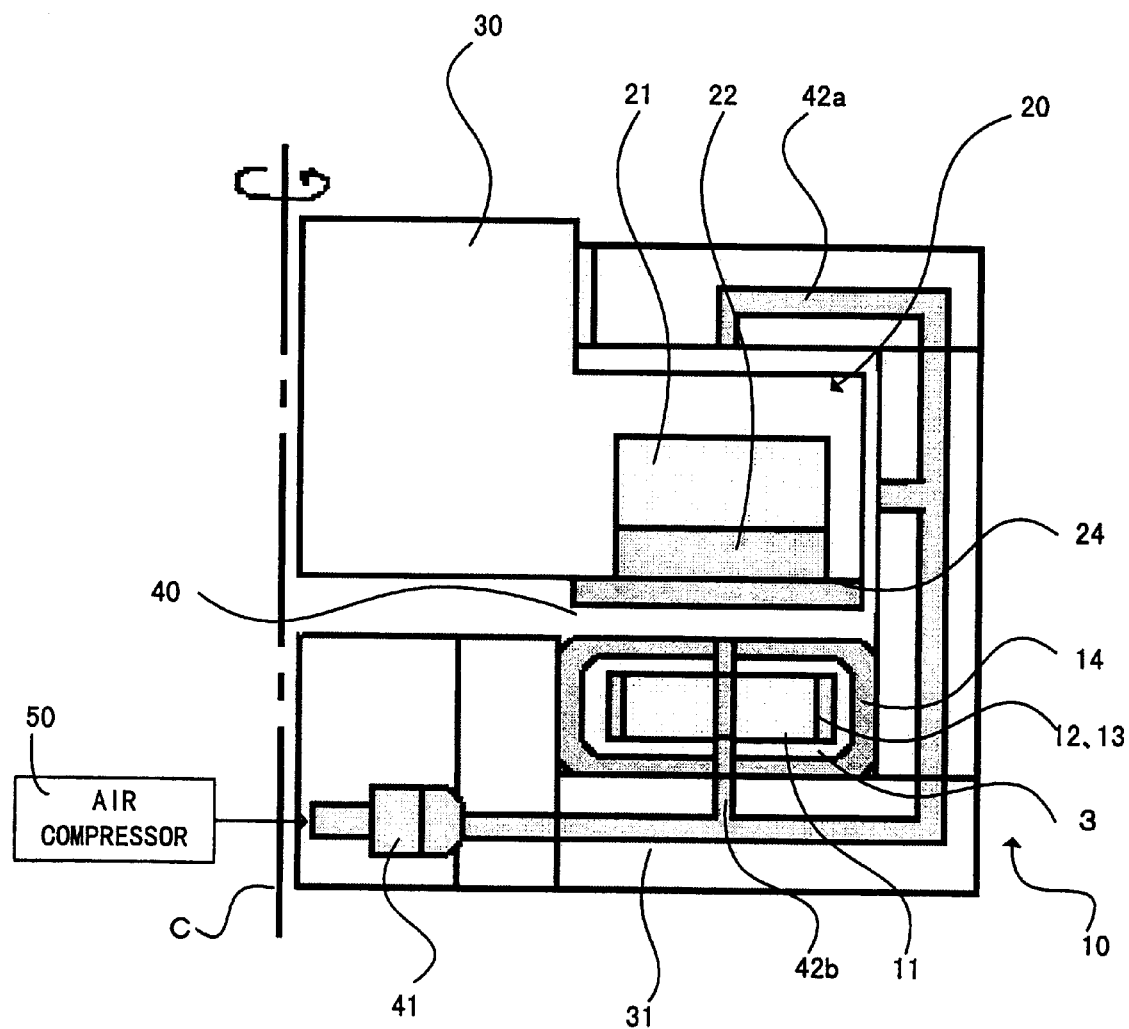
FIG. 12 is a sectional view showing an example of structure of a side rotor type pneumatic bearing motor according to the present invention.
Figure 13:
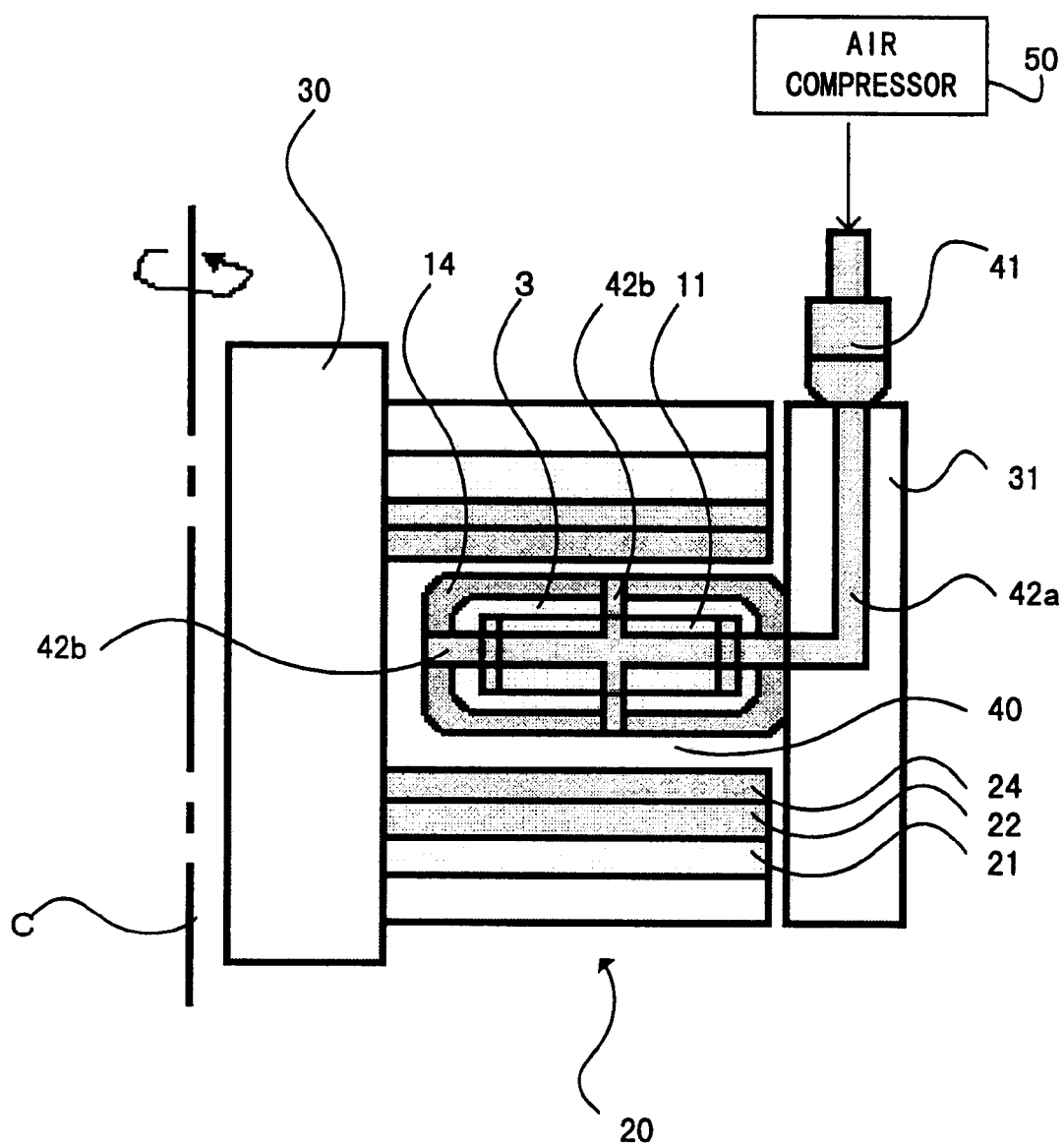
FIG. 13 is a sectional view showing an example of structure of a pneumatic bearing motor according to the present invention, in which two surfaces of a stator face a rotor.
Figure 14:
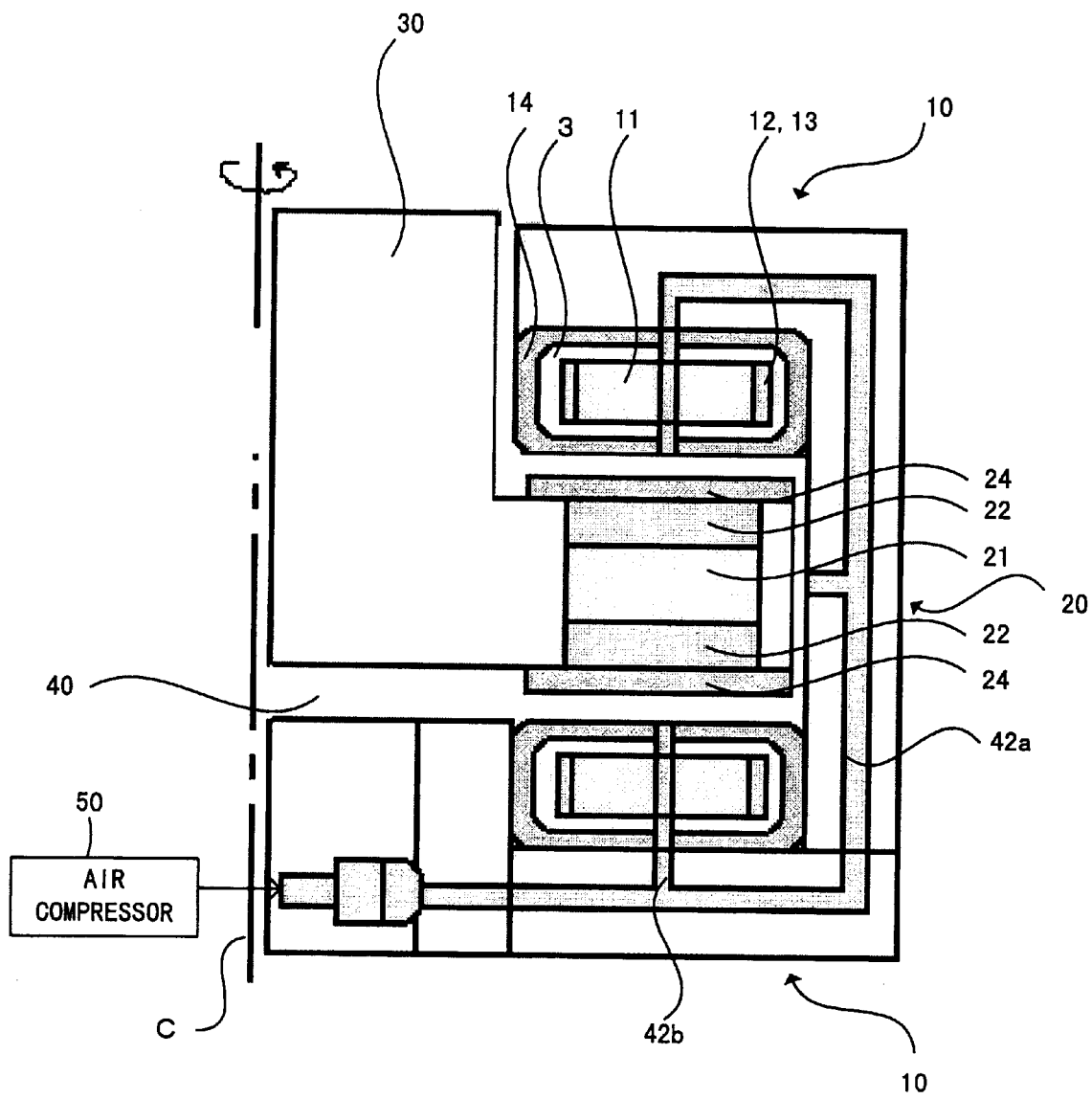
FIG. 14 is a sectional view showing an example of structure of a pneumatic bearing motor according to the present invention, in which two stators are provided.
Figure 15:
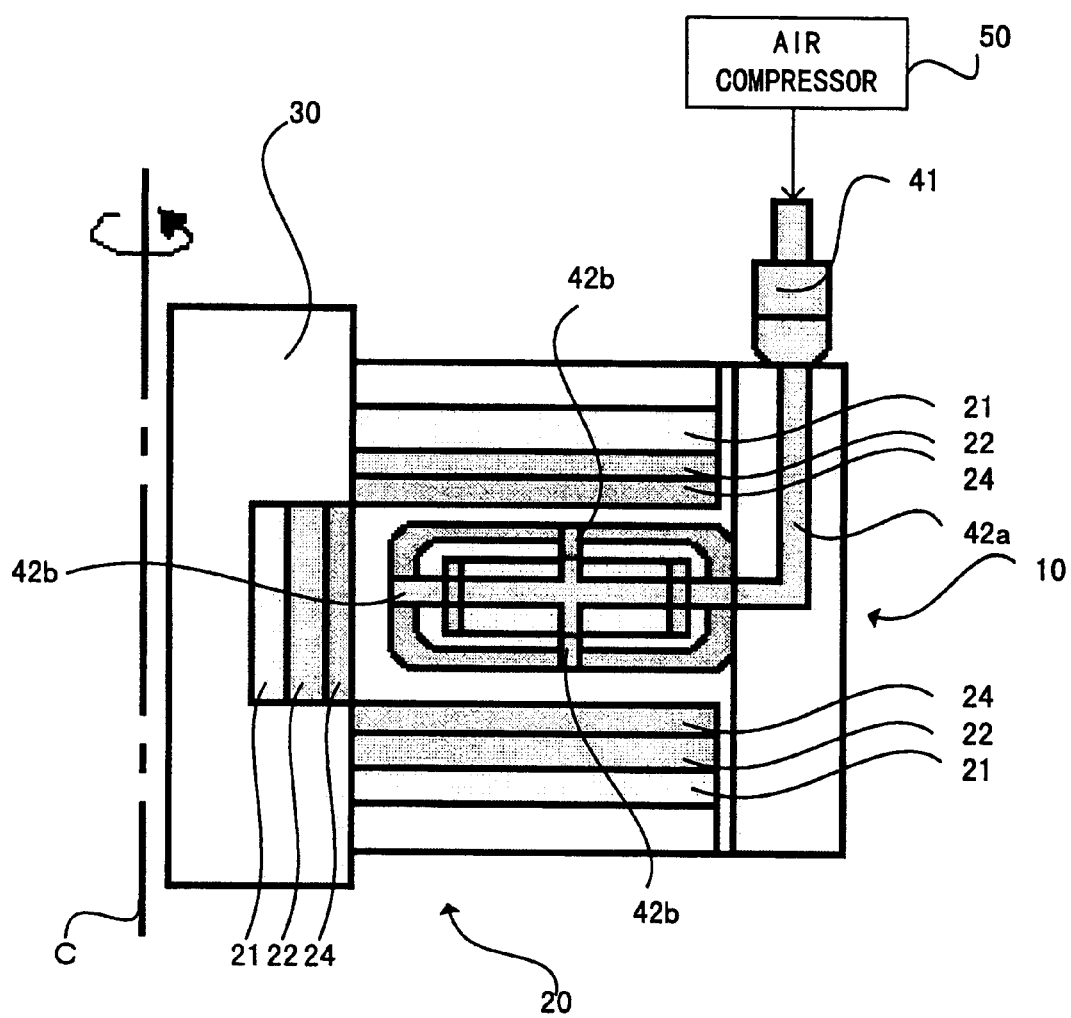
FIG. 15 is a sectional view showing an example of structure of a pneumatic bearing motor according to the present invention, in which three surfaces of a stator face a rotor.
Figure 16:
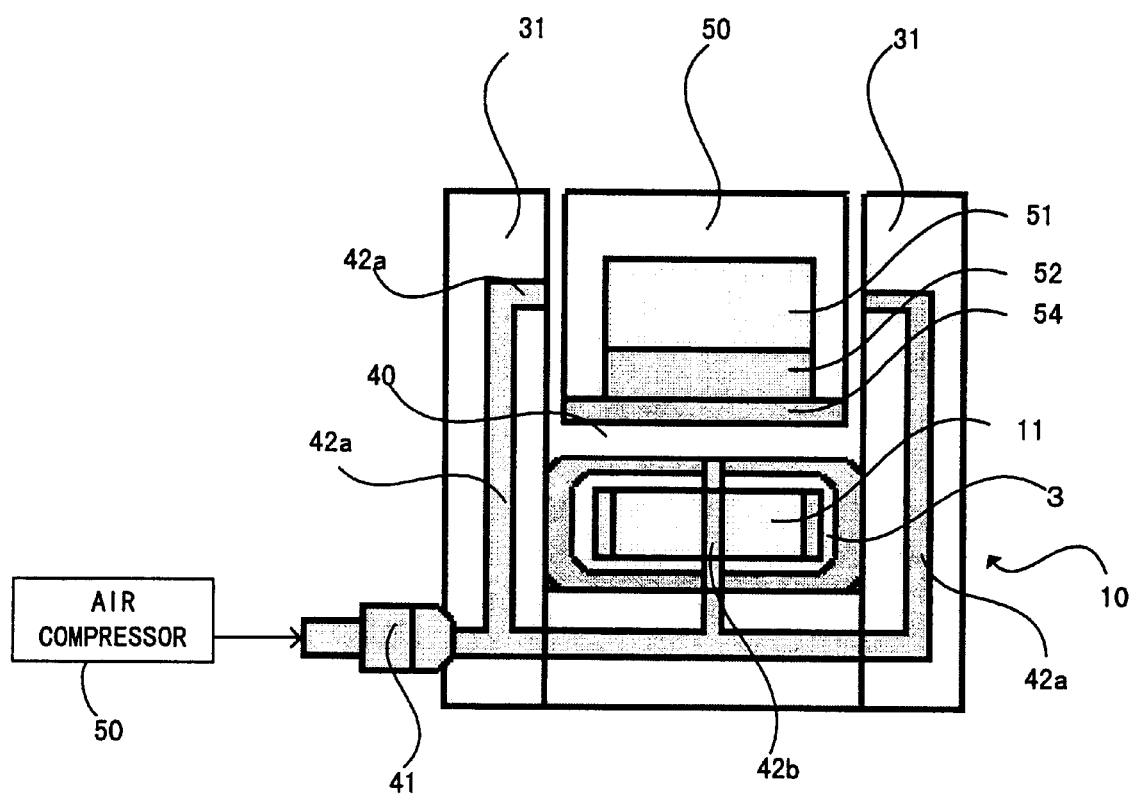
FIG. 16 is a sectional view for explaining an example of structure of a pneumatic bearing motor, in which the present invention is applied to a linear motor.
Figure 17:
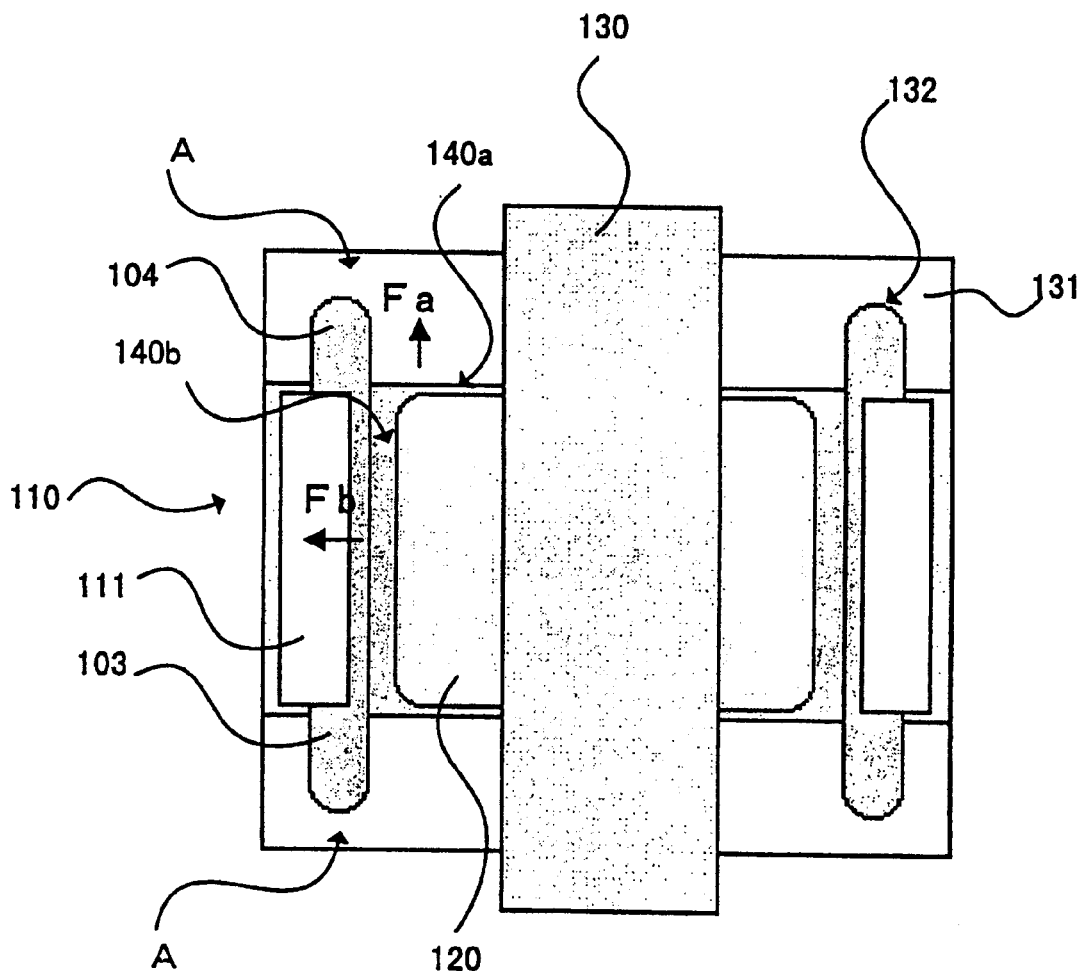
FIG. 17 is a schematic sectional view showing a conventional motor structure.

Next, various embodiments of the pneumatic bearing motor of the present invention will be described referring to FIGS. 10 to 16. Generally, rotary motors are classified by arrangement of a rotor under three types, that is, an inner rotor type, an outer rotor type and a side rotor type, each having its proper use. FIG. 10 shows an example of structure of an inner rotor type pneumatic bearing motor, FIG. 11 shows an example of structure of an outer rotor type pneumatic bearing motor, and FIG. 12 shows an example of structure of a side rotor type pneumatic bearing motor. FIGS. 13 to 15 relate to structure such that a stator or stators face a rotor with a plurality of surfaces thereof. FIGS. 13 and 14 shows examples in which a stator or stators face a rotor with two surfaces thereof, and FIG. 15 shows an example in which a stator faces a rotor with its three surfaces. FIG. 16 shows an example in which the present invention is applied to a linear motor.

FIG. 10 shows a first embodiment in which the present invention is applied to an inner rotor type motor. Here, a rotor 20 and a shaft 30 are arranged inside a stator and made to rotate about an axis C. The stator comprises a stator core 11 with printed boards 12, 13 laid on both end faces as viewed in the axial direction thereof, and windings 3 each formed by winding a wire around the printed boards 12, 13 and the stator core 11 in a manner such that the printed boards 12, 13 and the stator core 11 are wrapped in the wound wire in a lump. In order to reshape the inner surface of each winding 3 which defines a gap 40 for pneumatic bearing to have a predetermined smoothness, a covering 14 molded of resin is provided to each winding 3 at least on the side which faces the rotor 20. The covering 14 molded of resin may be provided all around each winding 3.

The rotor 20 comprises a rotor core 21 to which a magnet 22 is attached. In order to reshape the surface of the rotor 20 which defines the gap 40 for pneumatic bearing to have a predetermined smoothness, a covering 24 molded of resin is provided to the rotor 20 at least on the surface which faces the stator 10. The surfaces of the coverings 14, 24 molded of resin can be reshaped by grinding to have surface precision which a pneumatic bearing surface needs to have.

Compressed air for pneumatic bearing is introduced from an air compressor 50 through an air inlet 41 to the motor, and led through an air passage 42a formed in the housing 31 and an air passage 42b formed through the stator core 11 and a winding 3. In FIG. 10, the air passage 42a is formed in the housing 31 to extend on both sides of the rotor 20 as viewed in the axial direction thereof, so that the compressed air may be led to both gaps between the housing 31 and the two thrust surfaces of the rotor 20. The air passage 42b is formed to extend through the stator core 11 and the winding 3 to the rotor 20 side, so that the compressed air may be led to a gap between the stator 10 and the radial surface of the rotor 20. Thus, the compressed air is supplied to the gaps 40 between the rotor 20 and the housing 31 and between the rotor and the stator 10.

By virtue of the compressed air supplied to the gaps 40, the rotor 20 is supported in a non-contact manner with reference to the housing 31 and the stator 10.

A second embodiment shown in FIG. 11 relates to an outer rotor type motor, in which a rotor 20 and a shaft 30 are arranged outside a stator and made to rotate about an axis C.

The rotor and the stator of the second embodiment can be formed in the same manner as those of the first embodiment. Therefore, the explanation thereof will be omitted to avoid repetition.

Compressed air for pneumatic bearing is introduced from an air compressor 50 through an air inlet 41 to the motor, and led through an air passage 42a formed in a housing 31 and an air passage 42b formed through a stator core 11 and a winding 3. In FIG. 11, the air passage 42a is formed in the housing 31 to extend on both sides of the rotor 20 as viewed in the axial direction thereof, so that the compressed air may be led to both gaps between the housing 31 and the two thrust surfaces of the rotor 20. The air passage 42b is formed to extend through the stator core 11 and the winding 3 to the rotor 20 side, so that the compressed air may be led to a gap between the stator 10 and the radial surface of the rotor 20. Thus, the compressed air is supplied to the gaps 40 between the rotor 20 and the housing 31 and between the rotor 20 and the stator 10.

Since the rotor 20 and the shaft 30 are arranged outside the housing 31, a gap 43 communicating with the gap 40 needs to be provided between the housing 31 and the shaft 30, so that the shaft 30 can rotate relative to the housing 31.

By virtue of the compressed air supplied to the gaps 40, the rotor 20 is supported in a non-contact manner with reference to the housing 31 and the stator 10.

A third embodiment shown in FIG. 12 relates to a side rotor type motor, in which a rotor 20, a shaft 30, and a stator are arranged along an axis C of rotation, and the rotor 20 rotates about the axis C, facing the stator 10 in the direction of the axis C.

The rotor and the stator of the third embodiment can be formed in the same manner as those of the first embodiment. Therefore, the explanation thereof will be omitted to avoid repetition.

Compressed air for pneumatic bearing is introduced from an air compressor 50 through an air inlet 41 to the motor, and led through an air passages 42a formed in a housing 31 and an air passage 42b formed through a stator core 11 and a winding 3. In FIG. 12, the air passage 42a communicates with the air passage 42b on one side of the rotor 20 as viewed in the axial direction thereof, extends along the radial surface of the rotor 20, and fiber extends on the other side of the rotor 20. The passage 42a supplies the compressed air to a gap 40 between the radial surface of the rotor 20 and the housing 31 with its portion extending along the radial surface of the rotor 20, and to a gap 40 defined by one of the thrust surfaces of the rotor 20, the shaft 30 and the housing 31 with its portion extending on the above-mentioned other side of the rotor 20.

The air passage 42b extends through the stator core 11 and the winding 3 to the rotor 20 side, and supplies the compressed air to a gap 40 between the stator 10 and the other thrust surface of the rotor 20. Thus, the compressed air is supplied to the gaps 40 between the rotor 20 and the housing 31 and between the rotor 20 and the stator 10.

By virtue of the compressed air supplied to the gaps 40, the rotor 20 is supported in a non-contact manner with reference to the housing 31 and the stator 10.

In fourth, fifth and sixth embodiments, a stator or stators face a rotor with a plurality of surfaces thereof. For example, when a stator core has a quadrilateral cross section, three out of four surfaces of a stator, that is, surfaces except one surface with which the stator is fixed can be provided with electromagnetic circuits and made to face a rotor. By doing so, larger torque can be produced.

In the fourth embodiment shown in FIG. 13, a stator is provided to face a rotor with its two surfaces. Specifically, a stator core is arranged such that two opposite surfaces thereof face each other in the direction of an axis C of rotation, and a rotor which rotates about the axis C is arranged such that two magnetic pole faces thereof are positioned on both sides of the stator core to face the above two surfaces of the stator core, respectively.

Thus, the stator core is between the two magnetic poles of the rotor 20 which face each other, and torque is produced between the stator core and each magnetic pole. The rotor is supported with reference to the stator core by virtue of compressed air supplied to three gaps 40 formed between the stator and each of the two magnetic poles and between the stator and the shaft 30. The rotor and the stator of the fourth embodiment can be formed in the same manner as those of the first embodiment. Therefore, the explanation thereof will be omitted to avoid repetition. The compressed air for pneumatic bearing is introduced from an air compressor 50 through an air inlet 41 to the motor, and led through an air passages 42a formed in a housing 31 and an air passage 42b formed through the stator core 11 and a winding 3. In FIG. 13, the air passage 42a extending in the housing 31 communicates with the air passage 42b. The air passage 42b divides into three lines which extend towards the two magnetic pole faces of the rotor which face each other and the shaft 30, respectively. Thus the air passage 42b leads the compressed air to three gaps 40 formed between the stator core and each of the two magnetic poles and between the stator core and the shaft 30.

By virtue of the compressed air supplied to the gaps 40, the rotor 20 is supported in a non-contact manner with reference to the housing 31 and the stator 10.

The fifth embodiment shown in FIG. 14 uses two stators, and each one surface of two stator cores are made to face a rotor. Specifically, two stator cores are placed in the direction of an axis C of rotation with their electromagnetic circuits facing each other, and a rotor which rotates about the axis C is arranged such that two magnetic pole faces thereof are between the electromagnetic circuits of those two stator cores which face each other.

Thus, two stators are arranged on both sides of a single rotor, and torque is produced between each of the two stators and the corresponding magnetic pole face. The rotor is supported by virtue of compressed air supplied to three gaps 40 formed between the rotor and each of the two stator cores and between the rotor and a housing 31.

The rotor and the stator of the fifth embodiment can be formed in the same manner as those of the first embodiment. Therefore, the explanation thereof will be omitted to avoid repetition.

The compressed air for pneumatic bearing is introduced from an air compressor 50 through an air inlet 41 to the motor, and led through air passages 42a formed in the housing 31 and air passages 42b each formed through the stator core 11 and a winding 3. In FIG. 14, the air passage 42a extending in the housing 31 communicates with both air passages 42b, and also communicates with a gap between the thrust surface of the rotor 20 and the housing 31. The air passage 42b formed through each stator core leads the compressed air to a gap 40 between the stator core and the corresponding magnetic pole.

By virtue of the compressed air supplied to the gaps 40, the rotor 20 is supported in a non-contact manner with reference to the housing 31 and the stator 10.

In the sixth embodiment shown in FIG. 15, a stator core is provided to face a rotor with its three surfaces. Specifically, the stator core is arranged such that two opposite surfaces thereof face each other in the direction of an axis C of rotation, and a rotor which rotates about the axis C is arranged such that three magnetic pole faces thereof surround three surfaces of the stator core.

Thus, the rotor 20 surrounds the stator core with its three magnetic poles which are arranged in a C-like configuration as viewed in cross section, and torque is produced between each magnetic pole and the stator core. The rotor 20 is supported with reference to the stator core by virtue of compressed air supplied to three gaps 40 formed between the stator core and each of the three magnet poles, that is, two magnet poles which face each other and one magnet pole attached to the shaft 30.

The rotor and the stator of the sixth embodiment can be formed in the same manner as those of the first embodiment. Therefore, the explanation thereof will be omitted to avoid repetition. The compressed air for pneumatic bearing is introduced from an air compressor 50 through an air inlet 41 to the motor, and led through air passages 42a formed in a housing 31 and an air passage 42b formed through the stator core 11 and a winding 3. In FIG. 15, the air passage 42a extending in the housing 31 communicates with the air passage 42b. The air passage 42b divides into three lines which extend towards the two magnetic pole faces of the rotor which face each other and the shaft 30, respectively. Thus, the air passage 42b leads the compressed air to three gaps 40 formed between the stator core and each of the magnetic poles and between the stator core and the shaft 30.

By virtue of the compressed air supplied to the gaps 40, the rotor 20 is supported in a non-contact manner with reference to the housing 31 and the stator 10.

FIG. 16 shows a seventh embodiment in which the present invention is applied to a linear motor. A stator 10 and a housing 31 extend in the direction of movement, and a movable member 50 is supposed to move relative to the stator 10 and the housing 31, in the direction normal to the drawing sheet.

Specifically, the movable member 50 is movably arranged in a structure of a C-like cross section which is comprised of a stator core 11 and a housing 31 extending on both sides of the stator core 11, and torque is produced between a magnetic pole provided at the movable member 50 and the stator. The movable member 50 is supported by virtue of compressed air supplied to three gaps between the movable member and the stator core 11 and between the movable member and each of the two portions of the housing 31 which face each other.

The stator and the movable member of the seventh embodiment can be formed in the same manner as the stator and the rotor of the first embodiment. Therefore, the explanation thereof will be omitted to avoid repetition. It is to be noted that a movable core 50, a magnet 52, and a covering 54 molded of resin correspond to the rotor core 21, the magnet 22, and the covering 24 molded of resin, respectively.

The compressed air for pneumatic bearing is introduced from an air compressor 50 through an air inlet 41 to the motor, and led through an air passages 42a formed in the housing 31 and an air passage 42b formed through the stator core 11 and a winding 3. In FIG. 16, the air passage 42a extending in the housing 31 communicates with the air passage 42b. The air passage 42a also extends in the housing 31 on both sides of the movable member 50, and leads the compressed air to both gaps 40 between the movable member 50 and the housing 31. The air passage 42b extends through the stator core 11 and the winding 3 and leads the compressed air to the gap 40 between the stator core and the magnet pole of the movable member 50.

By virtue of the compressed air supplied to the gaps 40, the movable member 50 is supported in a non-contact manner with reference to the housing 31 and the stator 10.

The above embodiments have been described taking an example of a stator core which has a quadrilateral cross section. However, the cross section of the core can be chosen at discretion. It is also possible to provide two or more stators and supply current to those stators with deferent phases, to thereby control the distribution of a magnetic field produced by electromagnetic circuits, to thereby control rotation or movement smoothly.

As described above, the present invention can provide a pneumatic bearing motor provided with a pneumatic bearing which can be downsized without lowering the mechanical rigidity thereof.

What is claimed is:

1. A motor comprising:
   a rotor;
   a pneumatic bearing to rotatably support said rotor; and
   a stator having a slot-less stator core and a winding wound on said stator core in a plurality of layers formed on each other to form a toroidal shape so that a wire comprising the winding in respective layers is not crossed.

2. A motor according to claim 1, wherein a part of the winding in a layer crossing the winding in an adjacent layer is arranged at a position where magnetic field generated by the crossing part of the winding does not substantially affect rotation of said rotor.

3. A motor according to claim 2, wherein the part of the winding crossing the winding in the adjacent layer is formed on a side of the stator facing away from the rotor.

4. A motor according to claim 1, wherein said stator has a resin coating layer on a surface confronting said rotor.

5. A motor according to claim 1, wherein said rotor has a resin coating layer on a surface confronting said stator.

6. A motor according to claim 1, wherein said pneumatic bearing includes a gas supplying device to supply gas to a gap between confronting surfaces of said stator and said rotor, and a gap between confronting surfaces of said rotor and a housing.

7. A motor according to claim 1, wherein the motor is an inner rotor motor, and the rotor is arranged inside the stator.

8. A motor according to claim 1, wherein the motor is an outer rotor motor, and the rotor is arranged outside the stator.

9. A motor according to claim 1, wherein the motor is a side rotor motor, and the rotor and stator are arranged along an axis of rotation, and the rotor faces the stator in a direction of the axis of rotation and rotates around the axis of rotation.

10. A motor according to claim 1, wherein the rotor comprises two magnetic poles facing each other, and the stator is positioned between the two magnetic poles.

11. A motor according to claim 1, further comprising:
    a second stator having a slot-less stator core and a winding wound on said stator core in a plurality of layers to form a toroidal shape so that a wire comprising the winding in respective layers is not crossed, and the stator and second stator are arranged on opposite sides of the rotor.

12. A motor according to claim 1, wherein the rotor comprises three magnetic pole faces and the three magnetic pole faces surround the stator.

13. A motor according to claim 1, further comprising:
    a housing to house the stator, the housing and the stator forming a C-shaped cross section with the stator, and the rotor is supported in a non-contact manner in the C-shaped cross section.

* * * * *